US012789861B2

(12) United States Patent
Hoeck et al.

(10) Patent No.: US 12,789,861 B2
(45) Date of Patent: Nov. 10, 2026

(54) CABLE CAR AND METHOD OF OPERATING A CABLE CAR

(71) Applicant: Doppelmayr Management AG, Rotkreuz (CH)

(72) Inventors: Jari Hoeck, Hard (AT); Gerd Dür, Bildstein (AT)

(73) Assignee: DOPPELMAYR MANAGEMENT AG, Rotkreuz (CH)

( * ) Notice: Subject to any disclaimer, the term of this patent is extended or adjusted under 35 U.S.C. 154(b) by 472 days.

(21) Appl. No.: 18/484,607

(22) Filed: Oct. 11, 2023

(65) Prior Publication Data

US 2024/0116554 A1 Apr. 11, 2024

(30) Foreign Application Priority Data

Oct. 11, 2022 (AT) .............................. A 50785/2022

(51) Int. Cl.
*B61B 12/06* (2006.01)
*B61B 1/02* (2006.01)
(Continued)

(52) U.S. Cl.
CPC ................ *B61B 12/06* (2013.01); *B61B 1/02* (2013.01); *B61B 7/00* (2013.01); *B61B 12/00* (2013.01); *B61L 15/00* (2013.01); *B61L 23/00* (2013.01); *B61L 23/005* (2013.01); *B61L 27/20* (2022.01); *G01H 17/00* (2013.01); *G10L 25/18* (2013.01); *G10L 25/63* (2013.01)

(58) Field of Classification Search
CPC .. B61B 12/06; B61B 1/02; B61B 7/00; B61B 12/00; G01H 17/00; G10L 25/18; G10L 25/63; B61L 15/00; B61L 23/00; B61L 23/005; B61L 27/20; B61L 23/002
See application file for complete search history.

(56) References Cited

U.S. PATENT DOCUMENTS

| | | | | |
|---|---|---|---|---|
| 8,305,441 | B2 * | 11/2012 | Boghossian ..... | G08B 13/19682 348/149 |
| 2022/0159403 | A1 | 5/2022 | Abesser et al. | |
| 2023/0322281 | A1 * | 10/2023 | Mohr ...................... | B61B 11/00 104/88.02 |

FOREIGN PATENT DOCUMENTS

| | | |
|---|---|---|
| CN | 104492086 A | 4/2015 |
| CN | 109094578 A | 12/2018 |

(Continued)

OTHER PUBLICATIONS

Search Report dated Jul. 25, 2023 for Austrian Patent Application No. A50785/2022.

(Continued)

*Primary Examiner* — Zachary L Kuhfuss
(74) *Attorney, Agent, or Firm* — Husch Blackwell LLP

(57) ABSTRACT

In order to provide a cable car that enables an operation as autonomous as possible with the highest possible safety for persons, it is provided that in at least one cable car station a detection apparatus is provided for detecting a measurement variable of an airborne sound, that a classification unit is provided that is designed for this purpose, to identify at least one defined safety-relevant sound event from the measurement variable or a variable derived therefrom, and in that the control unit is designed to operate the cable car in a defined safety operating mode when a defined safety-relevant sound event is identified.

20 Claims, 2 Drawing Sheets

(51) Int. Cl.

| | |
|---|---|
| ***B61B 7/00*** | (2006.01) |
| ***B61B 12/00*** | (2006.01) |
| ***B61L 15/00*** | (2006.01) |
| ***B61L 23/00*** | (2006.01) |
| ***B61L 27/20*** | (2022.01) |
| ***G01H 17/00*** | (2006.01) |
| ***G10L 25/18*** | (2013.01) |
| ***G10L 25/63*** | (2013.01) |

(56) References Cited

FOREIGN PATENT DOCUMENTS

| | | | | |
|---|---|---|---|---|
| DE | 202013101423 U1 | | 7/2014 | |
| DE | 102015006814 A1 | | 12/2015 | |
| RU | 24823 U1 | | 8/2002 | |
| WO | WO-9708896 A1 | * | 3/1997 | ....... G08B 13/19613 |
| WO | 2008139203 A2 | | 11/2008 | |

OTHER PUBLICATIONS

European Search Report dated Mar. 14, 2024 for European Application No. 23202776.3.
Chinese Office Action for Application No. 202311315850.6, dated Mar. 26, 2026 (19 pages with Translation).

* cited by examiner

CABLE CAR AND METHOD OF OPERATING A CABLE CAR

CROSS REFERENCE

This application claims priority to Austrian Patent Application No. A50785/2022 filed on 11 Oct. 2022, the disclosure of which is incorporated herein by reference in its entirety.

TECHNICAL FIELD

The present disclosure relates to a cable car with a number of cable car stations and with a number of cable car vehicles which are movable between the number of cable car stations by means of a hoisting rope, wherein a control unit is provided for controlling the cable car. Furthermore, the present disclosure relates to a method for operating a cable car with a number of cable car stations and with a number of cable car vehicles which are moved between the number of cable car stations by means of a hoisting rope, wherein the cable car is controlled by means of a control unit.

BACKGROUND

Cable cars are used in a known manner mostly in winter sports areas to transport people, particularly skiers, between two cable car stations, for example from a valley station to a mountain station. In addition, cable cars are increasingly used in urban areas as a means of public transport. A basic distinction is made between circular and pendulum cable cars. In circular cable cars, a large number of cable car vehicles are usually suspended and moved by a hoisting rope in a circular movement along a closed track between two or more cable car stations. In the case of single-rope circular cable cars, the hoisting rope serves as both the track rope and the hauling rope. Multi-rope circular cable cars have one or more track ropes which form a track for the cable car vehicles, and the cable car vehicles each have a running gear with rollers with which the cable car vehicles roll along the track. The hoisting rope is used here as a hauling rope to drive the cable car vehicles.

The cable car vehicles may be designed as chair vehicles, each having a chair for the accommodation of a number of persons, or the cable car vehicles may be designed as cabin vehicles, each having a cabin for the accommodation of a number of persons or objects. The transport capacity of the cabins is usually larger than the transport capacity of the chairs. If only seat vehicles are provided, then it is also called a chair lift, if only cabin cars are provided, then it is also called a cabin lift. In addition to pure chair lifts and cabin lifts, there are also so-called combined lifts, which are a combination of a cabin lift and a chair lift. Here, in addition to the number of chair vehicles, a number of cabin vehicles are used. The different cable car vehicles of a combined lift are moved in a determined sequence with the same hoisting rope, for example three chairs and one cabin each.

In the case of chair lifts, each cable car station usually has only one chair entry area and one chair exit area. However, depending on where the cable car station is located, either the chair entry area (e.g. valley station) or the chair exit area (e.g. mountain station) is mostly used. In the case of combined lifts, on the other hand, the cable car stations each have an additional cabin entry area, cabin exit area or combined cabin entry/exit area for entering and/or exiting the cabins.

In contrast to circular cable cars, the cable car vehicles in pendulum cable cars are moved back and forth between two cable car stations in an oscillating movement. The cable car vehicles of pendulum cable cars are substantially exclusively designed as cabin vehicles and usually have a significantly larger transport capacity than the cable car vehicles of circular cable cars. Pendulum cable cars usually have one or more track ropes, which form a track for the cable car vehicles, and a running gear with rollers is provided on each of the cable car vehicles, with which the cable car vehicles roll along the track. The hoisting rope is used here as a hauling rope to drive the cable car vehicles.

Similar to the driverless operation that already exists in subways, there has recently been an increasing effort in the cable car area to achieve a higher degree of automation without compromising passenger safety. Until now, this was not readily possible due to the sensory systems and control technology available. Especially in the winter sports area, there is a greater safety risk for passengers due to the often unwieldy winter sports equipment, sometimes large crowds or exhaustion, so that operation without operating personnel who can intervene in an emergency has not been possible without further ado.

Until now, the entry and exit areas of cable cars have generally been monitored visually (by sight) and acoustically (by sound) by the cable car personnel present. If, for example, it was visually detected that a person had fallen or this was detected acoustically (e.g. due to loud screams or cries for help), the cable car was stopped manually. However, on the one hand, this is personnel-intensive, which runs counter to the aspiration of autonomous operation. Second, the reliability of human monitoring is usually limited due to lack of attention, visual obstruction, or ambient noise.

It is therefore an object of the present disclosure to provide a cable car and a method for operating a cable car that enable an operation as autonomous as possible with the highest possible safety for persons.

SUMMARY

According to the present disclosure, the object may be achieved with the cable car mentioned at the beginning in that a detection apparatus for detecting a measurement variable of an airborne sound is provided in at least one cable car station, in that a classification unit is provided which is designed to identify at least one defined safety-relevant sound event from the measurement variable or a variable derived therefrom, and in that the control unit is designed to operate the cable car in a defined safety operating mode when a defined safety-relevant sound event is identified. This allows the airborne sound to be automatically analyzed and the cable car to be operated in a safety operating mode if a safety-relevant sound event is detected.

The object may be further achieved by the aforementioned method in that a measurement variable of airborne sound is detected in at least one cable car station, in that at least one defined safety-relevant sound event is identified from the measurement variable or a variable derived therefrom by means of a classification unit, and in that the control unit operates the cable car in a defined safety operating mode when the at least one defined safety-relevant sound event is identified.

The detection apparatus preferably comprises at least one microphone. This allows reliable commercially available microphones to be used to capture the airborne sound. Furthermore, it is advantageous if the detection apparatus is arranged in the at least one cable car station in such a manner that the measurement variable can be detected in the area of a platform of the at least one cable car station. In particular, this allows the sounds generated by the cable car passengers to be recorded and evaluated. For example, multiple microphones may also be provided, arranged at different locations to detect the airborne sound at different locations in the cable car station. Redundancy of microphones to increase fail-safety is also beneficial.

In one embodiment, a sound pressure is used as a measurement variable. The derived variable can be, for example, a sound pressure level. In order to improve the detection performance, different variables could also be evaluated in parallel, for example.

The classification unit may be configured to generate a spectrogram from the detected measurement variable or the variable derived therefrom and to determine the at least one defined safety-relevant sound event from the spectrogram. This procedure has proven to be advantageous for detecting safety-relevant sound events. If real-time evaluation is not possible, then a suitable audio buffer can also be provided, for example, which temporarily stores the acquired measurement variable or the derived variable.

A classification model may be implemented in the classification unit to determine the at least one defined safety-relevant sound event. The classification model can be configured, for example, to determine from the spectrogram a confidence value representative of a probability of occurrence of the at least one defined safety-relevant sound event, and a threshold value can be specified or can be preset. The control unit can be designed to operate the cable car in safety operation mode when the confidence value exceeds the threshold. This allows a simple query to be provided. The threshold value can also be changed variably if necessary.

It may be advantageous if an analysis model is provided for analyzing a detection performance of the classification model and the threshold value can be set based on the analysis model, preferably via a user interface. For example, an accuracy hit ratio model may be provided as an analysis model. This means that the threshold value can be determined on the basis of existing measurement data, for example, and the threshold value can also be easily adapted to the risk potential of different cable cars.

The classification model may comprise an artificial intelligence model, preferably an artificial neural network. The artificial intelligence model can be trained with existing data and also continuously improved. For example, the artificial intelligence model can be iteratively analyzed and optimized by means of the above-mentioned analysis model, which can improve the detection performance.

The at least one defined safety-related sound event preferably comprises a defined characteristic cry of a person, in particular a cry for help, a pain-related cry, an aggressive cry, or a fearful cry. This allows the most important hazard scenarios to be covered. Training the artificial intelligence model can be done, for example, using measurement data that comprise a variety of defined safety-relevant sound events. The model can first be manually specified which sound events are defined as safety-relevant sound events to be detected and which sound events are irrelevant (because they are not safety-relevant). The model learns to distinguish the relevant from the irrelevant sound events based on this specification.

The cable car usually also comprises a drive apparatus for driving the cable car vehicles. The control unit is preferably designed to control the drive apparatus in the safety operating mode in order to stop the drive of the cable car vehicles or to reduce a conveyor speed of the cable car vehicles. This allows the cable car to be stopped automatically, for example, if a characteristic human cry classified as safety-relevant is detected.

Alternatively or additionally, a signal apparatus for generating an alarm signal, preferably an acoustic alarm signal and/or optical alarm signal and/or electronic alarm signal, can also be provided in the cable car, and the control unit can be designed to control the signal apparatus for generating at least one alarm signal in the safety operating mode. In this way, for example, the passengers in the cable car station where the safety-relevant sound event was detected can be warned or informed, or also any operating personnel of the cable car. Passengers or the operating personnel of another cable car station could also be warned or informed.

These objects are merely illustrative of the features and advantages associated with the present disclosure and should not be deemed as limiting in any manner. These and other objects, features and advantages of the present disclosure will become apparent from the following detailed description when taken in conjunction with the referenced drawings.

BRIEF DESCRIPTION OF THE FIGURES

Reference is now made more particularly to the drawings, which illustrate the best presently known mode of carrying out the disclosure and wherein similar reference characters indicate the same parts throughout all views.

DETAILED DESCRIPTION

Figure 1:
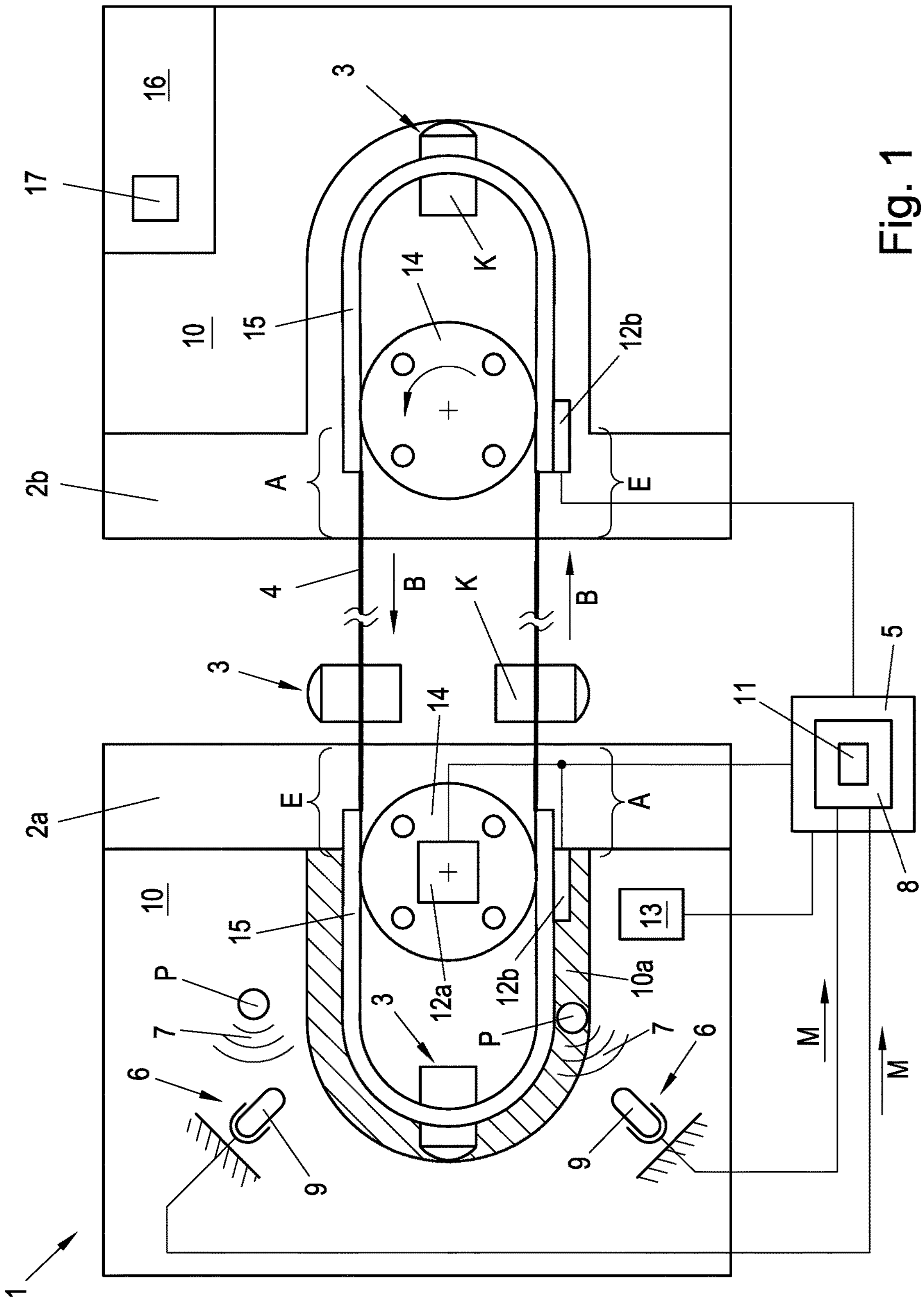
FIG. 1 shows a cable car in an exemplary embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The headings (such as “Background” and “Summary”) and sub-headings used herein are intended only for general organization of topics within the present disclosure and are not intended to limit the disclosure of the technology or any aspect thereof. In particular, subject matter disclosed in the “Introduction” may include novel technology and may not constitute a recitation of prior art. Subject matter disclosed in the “Summary” is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the apparatus and systems of this technology and, unless explicitly stated otherwise, are not intended to be a representation that given embodiments of this technology have, or have not, been made or tested.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all distinct values and further divided ranges within the entire range.

An exemplary cable car 1, which is designed as a circular cable car, is represented in FIG. 1. Here, the cable car 1 has two cable car stations 2*a*, 2*b* and a plurality of cable car vehicles 3 that are movable between the cable car stations 2*a*, 2*b* by means of a hoisting rope 4. The cable car stations 2*a*, 2*b* are designed as terminal stations where the cable car vehicles 3 are turned around. For example, the first cable car station 2*a* could be a valley station in a ski resort and the second cable car station 2*b* could be a mountain station. The cable car 1 is designed here merely by way of example as a pure cabin lift, wherein the cable car vehicles 3 are designed as cabin cars. Each cable car vehicle 3 thus has a cabin for the accommodation of persons and/or objects.

The cable car 1 is designed as a single-rope circular cable car in which the hoisting rope 4 serves both as a hauling rope for driving the cable car vehicles 3 and as a track rope for carrying the cable car vehicles 3. For simplicity, the hoisting rope 4 is shown cut off in the middle. The hoisting rope 4 is deflected around a sheave 14 in each of the cable car stations 2*a*, 2*b* to form a closed loop. On the free stretch between the cable car stations 2*a*, 2*b*, the cable car vehicles 3 can thus be moved along the cable loop formed by the hoisting rope 4 in two directions of movement B, as indicated by the arrows.

In a known manner, the cable car vehicles 3 can each be decoupled from the hoisting rope 4 in an entry area E of the cable car stations 2*a*, 2*b*, then decelerated and moved at reduced speed (relative to the speed of the hoisting rope 4) along a platform 10 to the exit area A. In the area of platform 10, passengers P can get on and off the cable car vehicles. In the exit area A, the cable car vehicles 3 can be accelerated again to the speed of the hoisting rope 4 and coupled to the hoisting rope 4. A guide rail 15 is also provided in each of the cable car stations 2*a*, 2*b*, along which the cable car vehicles 3 can be moved from the entry area E to the exit area A.

For detachable coupling with the hoisting rope 4, the cable car vehicles 3 each have a suitable (not shown) rope clamp. A rope clamp usually comprises a suitable preload apparatus, preferably comprising a number of springs, which preloads the rope clamp in the closed state. In each of the entry areas E and the exit areas A, an actuating apparatus (not shown) is provided for actuating the rope clamps. One or more (not shown) guide rollers are preferably arranged on the cable car vehicles 3, preferably each on the cable clamp, with which the cable car vehicles 3 can roll along the guide rails 15.

In order to be able to move the cable car vehicles 3 decoupled from the hoisting rope 4 within the cable car stations 2*a*, 2*b* along the respective guide rail 15, an auxiliary drive (not shown) is usually provided. The auxiliary drive can be designed as a tire conveyor or chain conveyor, for example. A tire conveyor has a plurality of driven tires arranged in series along guide rail 15. To drive a cable car vehicle 3, the tires can interact with a friction lining provided on the cable car vehicle 3, preferably on the cable clamp.

Contrary to the representation, one or more further cable car stations could of course be provided between the cable car stations 2*a*, 2*b* as is well known and serve as intermediate stations, which may be the case particularly in the case of very long transport distances. In contrast to the terminal stations 2*a*, 2*b* shown, there is no turning of the cable car vehicles 3 in the middle stations, but the cable car vehicles 3 can be moved on in the same direction of movement. In the intermediate station, an entry area E and an exit area A are thus provided for each direction of travel.

Between two cable car stations 2*a*, 2*b*, there are usually also several (not shown) cable car supports for guiding the hoisting rope 4. A number of rollers, for example in the form of a so-called roller battery, are provided on each of the cable car supports, on which the hoisting rope 4 is guided. Of course, the embodiment shown is only exemplary and the cable car 1 could also be designed as a circular cable car in the form of a chair lift or combined lift or as a pendulum cable car. The basic structure and function of a cable car 1 is well known, so no further description will be given at this point. However, all possible embodiments are comprised within the scope of the present disclosure.

The cable car 1 also has a control unit 5 for controlling the cable car 1. In the context of the present disclosure, the control unit 5 is designed at least for controlling a conveyor speed of the cable car vehicles 3. Of course, the control unit 5 can also be provided to control other functions of the cable car 1, but these are not relevant to the present disclosure. The control unit 5 is only shown schematically in FIG. 1 and can be provided in practice, for example, at a suitable location in one of the cable car stations 2*a*, 2*b*. The control unit 5 has suitable hardware and/or software. Of course, the control unit 5 could also comprise several separate control units that communicate with each other via a suitable communication connection.

Furthermore, a suitable drive apparatus is provided for driving the cable car vehicles 3. The drive apparatus may comprise one or more first drive units 12*a* for driving the hoisting rope 4, and one or more second drive units 12*b* for driving the auxiliary drives. For example, the drive units 12*a*, 12*b* may each have a suitable electric machine. In the example according to FIG. 1, the first drive unit 12*a* is arranged in the first cable car station 2*a* and is designed to drive the sheave 14. In addition, a second drive unit 12*b* is provided in each of the two cable car stations 2*a*, 2*b* for driving the respective auxiliary drive.

In accordance with the present disclosure, a detection apparatus 6 for detecting a measurement variable M of an airborne sound 7 is provided in at least one of the cable car stations 2*a*, 2*b*. In the example shown, the detection apparatus 6 is arranged only in the first cable car station 2*a* for simplicity. Of course, however, a detection apparatus 6 could also be provided in the second cable car station 2*b* in an analogous manner. In addition, a classification unit 8 is provided, which is designed to identify at least one defined safety-relevant sound event from the measurement variable M or a variable derived therefrom, and the control unit 5 is designed to operate the cable car 1 in a defined safety operating mode when a defined safety-relevant sound event is identified. The classification unit 8 can, for example, be integrated in the control unit 5, e.g. in the form of software, but could also be designed as a separate unit that is connected via a suitable (wired or wireless) communication connection on the one hand to the detection apparatus 6 and on the other hand to the control unit 5.

In the example shown, the detection apparatus 6 comprises, by way of example, two microphones 9 arranged at different positions within the first cable car station 2*a*. The microphones 9 are represented only schematically and may be arranged, for example, on a suitable stationary structure in an upper area of the cable car station 2*a*. The microphones 9 are arranged in such a way that the measurement variable M of the airborne sound 7 can be recorded in the area of the platform 10 in each case. For example, the measurement variable M can be a sound pressure and/or the variable derived from the measurement variable M can be a sound pressure level.

In the context of the present disclosure, the at least one defined safety-related sound event preferably comprises a defined characteristic cry of a person P, in particular a cry for help, a pain-related cry, an aggressive cry or a fearful cry. However, the list is of course not exhaustive, and the defined safety-relevant sound event could comprise even more screams. FIG. 1 shows an exemplary representation of a person P who has fallen from the platform 10 into a pit 10*a*, indicated by dashed lines, in which the cable car vehicles 3 are moving. Person P emits a cry for help in the form of an airborne sound 7 representing the safety-related sound event. The airborne sound 7 can be detected by the microphone 9.

However, the safety-related sound event is not limited to human screams, but could also comprise, for example, other sound events that indicate a risk to people. It would be conceivable, for example, that the safety-relevant sound event also comprises characteristic sound events of a technical nature that indicate a defect in the cable car, such as characteristic squealing, a characteristic bang or the like.

In the safety operation mode, the control unit 5 can control the drive apparatus, for example the first drive unit 12*a* and the second drive units 12*b*, to completely stop the drive of the cable car vehicles 3 or to reduce a conveyor speed of the cable car vehicles 3. In the specific example, this can mean that the classification unit 8 identifies a safety-relevant sound event in the form of a cry for help from the measurement variable M of the airborne sound 7 generated by the person P in the pit 15*a*.

The control unit 5 can then switch the cable car 1 from the normal operating mode to the safety operating mode and stop, for example, the first drive unit 12*a* and the second drive unit 12*b*. Alternatively, however, only the conveyor speed could be reduced. In safety operating mode, however, different actions could also be provided for different defined safety-relevant sound events, for example. For example, a first safety-relevant sound event could be assigned a lower hazard level than a second safety-relevant sound event that is different from the first safety-relevant sound event. When the first safety-relevant sound event is detected, for example, only the conveyor speed of the cable car vehicles 3 could then be reduced, while when the second safety-relevant sound event is detected, the drive is stopped completely.

Alternatively or additionally, a signal apparatus 13 can also be provided for generating an alarm signal. The alarm signal thereby preferably comprises an acoustic alarm signal and/or a visual alarm signal and/or an electronic alarm signal. In the safety operation mode, the control unit 5 can control the signal apparatus 13 to generate at least one alarm signal. FIG. 1 shows an example of a schematic signal apparatus 13 in the first cable car station 2*a*. Of course, a signal apparatus 13 could also be provided in the second cable car station 2*b*. This also allows passengers in the second cable car station 2*b* to be warned or informed if a safety-related incident occurs in the first cable car station 2*a*.

The alarm unit 13 could comprise, for example, a warning light that is activated in the safety operation mode to warn people located in the respective cable car station 2*a*, 2*b*. Alternatively or additionally, the signal apparatus 13 could also have a loudspeaker via which a warning tone is emitted in the safety operating mode to warn the persons located in the respective cable car station 2*a*, 2*b*. However, the signal apparatus 13 could also be designed, for example, to generate an electronic alarm signal in the form of an alarm message and send it to a display apparatus. In this case, the signal apparatus 13 could also be part of the control unit 5, for example. The signal apparatus 13 could comprise, for example, a stationary display apparatus, e.g. in the form of a screen, which is arranged in the first cable car station 2*a*. This allows the passengers located in the respective cable car station 2*a*, 2*b* to be warned or informed.

The cable car 1 may also include an operating space 16 for the operating personnel of the cable car 1. In FIG. 1, the operating space 16 is provided in the second cable car station 2*b* as an example. Of course, an operating space 16 could alternatively or additionally be provided in the first cable car station 2*a*. In this case, the signal apparatus 13 could also comprise, for example, a stationary display apparatus 17, e.g. again in the form of a screen, which is arranged in the operating space 16. The stationary display apparatus 17 could, for example, be a part of a user interface through which the cable car 1 can be controlled. If, for example, there is no operating personnel in the first cable car station 2*a*, then the operating personnel in the second cable car station 2*b* could be informed or warned about the safety-relevant incident in the first cable car station 2*a* by means of the display apparatus 17 and take certain actions, e.g. initiate first aid measures.

It can also be advantageous if a camera (not shown) for monitoring the platform 10 is provided in the cable car station in which the detection apparatus 6 is provided (here the first cable car station 2*a*). The images or videos captured by the camera can then be transmitted, preferably in real time, to a display apparatus, such as the display apparatus 17 of the second cable car station 2*b*. This enables the operating personnel in the second cable car station 2*b* to analyze the current situation in the first cable car station 2*a* and take action if necessary. For example, the operating personnel can manually switch the cable car 1 back from the safety operating mode to the normal operating mode once it has been detected that the hazardous situation has passed. In the specific example, for example, if it has been determined via the camera images that person P, who fell into pit 15*a* and triggered the safety operation mode by crying for help, is again in a safe area, e.g. on platform 15, then normal operation can be continued. Activation of the normal operating mode could be performed by any operating personnel present in the first cable car station 2*a*.

In addition to or as an alternative to the stationary display apparatus 17 shown, however, the signal apparatus 13 could also comprise, for example, a mobile display apparatus (not shown). For example, the mobile display apparatus could comprise a mobile terminal device, such as a smartphone, tablet, etc. This could also warn or inform any operating personnel located outside the cable car stations 2*a*, 2*b* about the hazardous situation.

Figure 2:
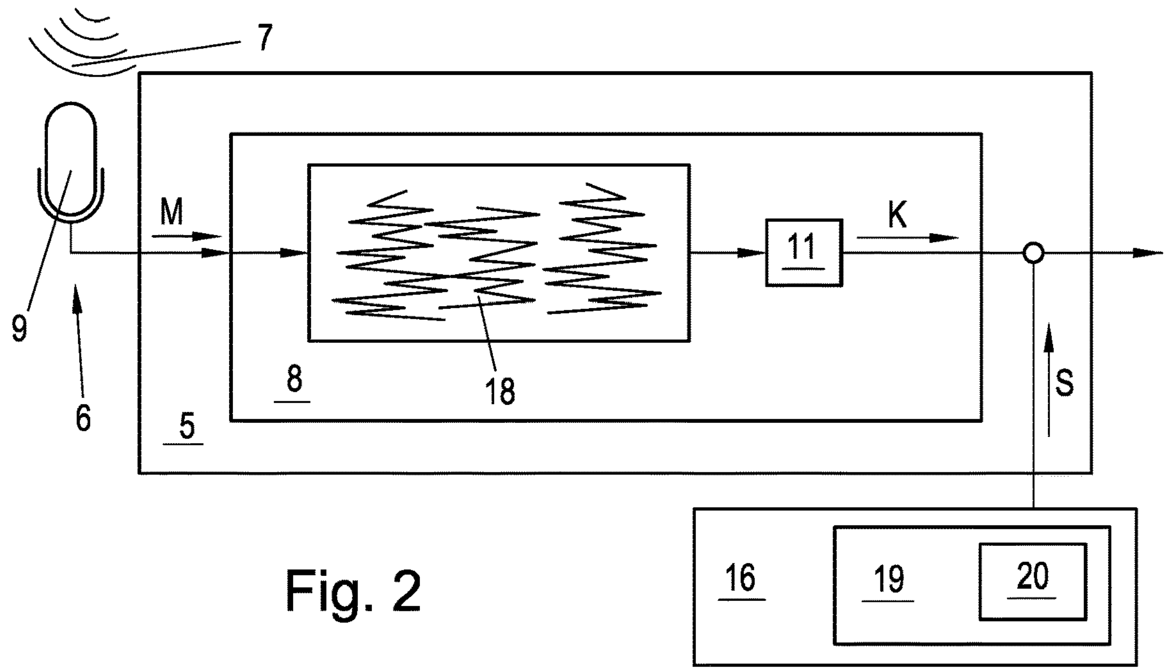
FIG. 2 shows the identification of a defined safety-relevant sound event by means of a block diagram according to an embodiment of the present disclosure.

FIG. 2 shows a preferred representation of the identification of the defined safety-relevant sound event using a block diagram. The detection device 6, here the microphone 9, generates a measured variable M of the airborne sound 7 and transmits the measured variable M to the classification unit 8. The classification unit 8 can, for example, be integrated in the control unit 5. The classification unit 8 can generate a spectrogram 18 from the detected measurement variable M of the airborne sound 7, e.g. the sound pressure, or the variable derived therefrom, e.g. the sound pressure level. From the spectrogram 18, the classification unit 8 can determine the at least one defined safety-relevant sound event. To determine the at least one defined safety-relevant sound event from the spectrogram 18, a classification model 11 is preferably implemented in the classification unit 8, e.g. in the form of suitable software.

The classification model 11 may, for example, determine from the spectrogram 18 a confidence value K representative of a probability of occurrence of the at least one defined safety-relevant sound event. The confidence value K can thus be between 0 and 1 or 0% and 100%, for example. Based on the confidence value K, the control unit 5 can then decide whether a defined safety-relevant sound event is present or not. To decide this, for example, a threshold value S can be predetermined and the control unit 5 can compare the predetermined threshold value S with the determined confidence value K. The threshold value can, for example, again be set between 0 and 1 or 0% and 100%. If the determined confidence value K exceeds the predetermined threshold value S, this means that a safety-relevant sound event is present and the control unit 5 can switch the cable car 1 to the safety operation mode. If the confidence value K falls below the predetermined threshold value S, this means that there is no safety-relevant sound event and the control unit 5 can continue to operate the cable car 1 in normal operating mode.

The threshold value S can either be fixed or the threshold value S can be adjustable, e.g. via a user interface 19 connected to the control unit 5. The user interface 19 can be, for example, the above-mentioned user interface of the operating space 16, via which the cable car 1 can be controlled by the operating personnel. The threshold value S can either be set completely freely, e.g. manually, or an analysis model 20 could also be provided, for example, with which a suitable threshold value S can be determined. The analysis model 20 is used to analyze the detection performance of the classification model 11 and may comprise, for example, an accuracy hit ratio model.

Figure 3:
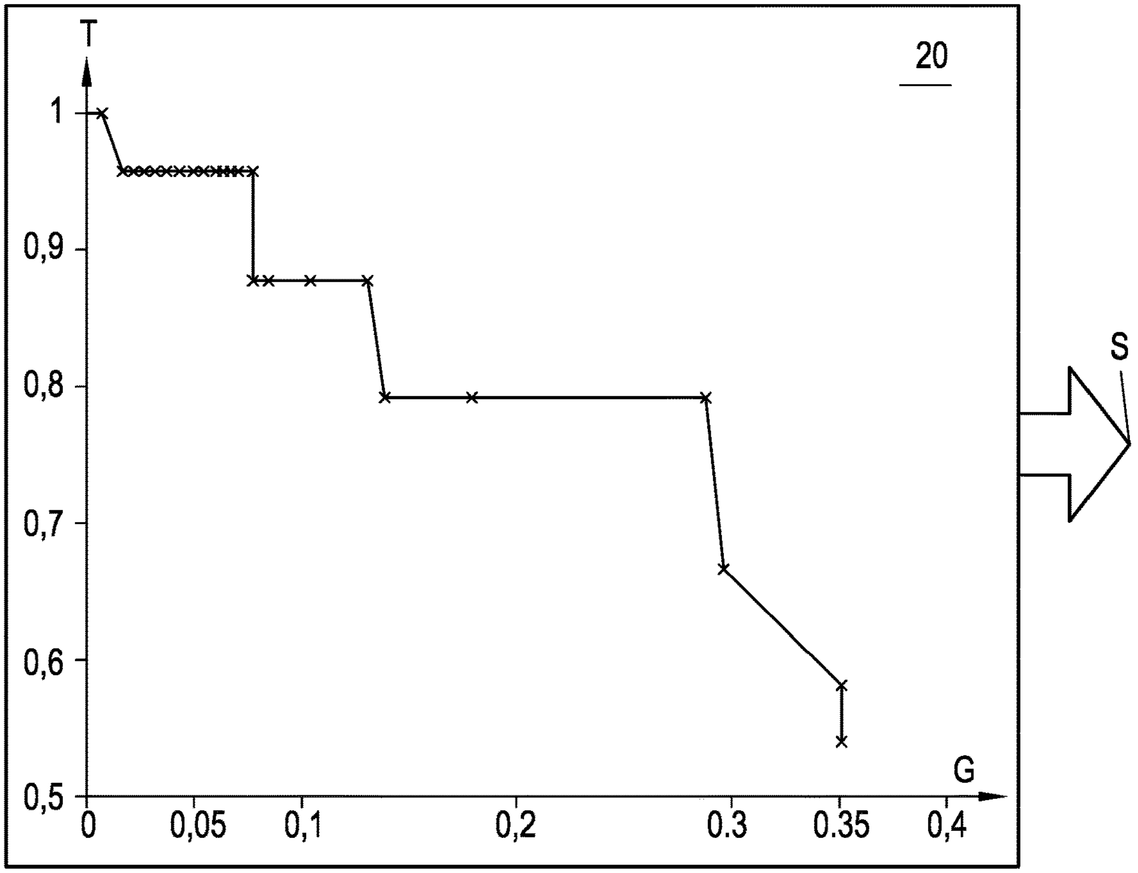
FIG. 3 shows an accuracy hit ratio model for determining a threshold value for the identification of the defined safety-relevant sound event.

An example accuracy hit ratio model is shown in FIG. 3. The hit rate T between 0.5 and 1 (or 50% to 100%) is plotted on the ordinate and the accuracy G between 0 and 0.4 (or 0 and 40%) is plotted on the abscissa. In a fictitious example of performance analysis, it is assumed that a total of 24 actual safety-relevant sound events are contained in a recording of the measurement variable M. These may have been identified as such by a human, for example. The points in the diagram correspond to the 24 actual safety-related sound events. For example, if the classification unit 8 identifies a total of 67 safety-relevant sound events and 19 of the 24 actual safety-relevant sound events are among them, then the accuracy G corresponds to a value of G=19/67=28.4% and the hit rate T corresponds to a value of T=19/24=79.2%.

The hit rate T thus indicates how many of the actual safety-relevant sound events were identified and the accuracy G indicates how high the probability is that a detected safety-relevant sound event is an actual safety-relevant sound event. Hit rate T and accuracy G are therefore opposite and the threshold value S can be set as a compromise between accuracy G and hit rate T. Depending on whether accuracy G or hit rate T is given higher priority in a specific application, a suitable threshold value S can be selected. For example, it may be advantageous if the threshold value S is set to achieve a relatively high hit rate T of at least 75%, for example. In the example shown in accordance with FIG. 3, for example, the required hit rate T≥75% is achieved with a threshold value S=0.9.

Since failure to detect an (actual) safety-relevant sound event in a cable car 1 can have serious consequences, it is advantageous if the threshold value S is set so that as many safety-relevant sound events as possible are detected. Although this may occasionally lead to undesired false detections during operation and consequently to a switchover to the safety operating mode (because a sound event is incorrectly identified as a safety-relevant sound event by the classification unit 8), the risk that a (actually) safety-relevant sound event remains undetected is reduced at the same time. However, the risk potential of a cable car 1 can be assessed on a case-by-case basis, for example, and a suitable threshold value S can be selected depending on this.

For example, in a cable car 1 where operating personnel are present, it is possible to set the threshold value S to achieve a higher accuracy G with a lower hit rate T. Although this may mean that actual safety-relevant sound events remain undetected, the operating personnel present can intervene manually in such cases. The advantage is thus that there are fewer automatic activations of the safety operating mode. Conversely, in the case of fully autonomous operation without operating personnel, it may be desirable that no actual safety-relevant sound event remains undetected, so that any false detections are accepted. In this case, the threshold value S can be set, for example, so that a lower accuracy G is achieved with a higher hit rate T.

The classification model preferably comprises an artificial intelligence (AI) model, preferably an artificial neural network. Such AI models are known in the prior art, so no further description is given here. The person skilled in art can choose a suitable model. The AI model can be trained with training data before the cable car 1 is put into operation. For this purpose, for example, a large number of sound events can be generated and the AI model can be specified which sound events are a defined safety-relevant sound event to be detected and which sound events are irrelevant. The AI model then independently learns to distinguish the safety-relevant sound events from the irrelevant sound events. However, measurement data from known cable cars could also be used, for example, and the safety-relevant sound events contained therein could be manually identified and specified to the model. For example, training can be iteratively repeated to improve detection performance. For example, an analysis of the detection performance may be performed at each step by means of the analysis model 20.

Exemplary embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

What is claimed is:

1. A cable car with a number of cable car stations and with a number of cable car vehicles which can be moved between the number of cable car stations by means of a hoisting rope, wherein a control unit is provided for controlling the cable car, comprising:

a detection apparatus for detecting a measurement variable of an airborne sound in at least one cable car station;

a classification unit configured to identify at least one defined safety-relevant sound event from at least one of the measurement variable and a variable derived therefrom; and wherein the control unit is configured to select a defined safety operating mode corresponding to the defined safety-related sound event and to operate the cable car in the selected defined safety operating mode when a defined safety-relevant sound event is identified.

2. The cable car according to claim 1, wherein the detection apparatus is configured in the at least one cable car station and wherein the detection apparatus is configured to detect the measured variable in the area of a platform of the at least one cable car station.

3. The cable car according to claim 1, wherein the measurement variable comprises a sound pressure or the derived variable comprises a sound pressure level.

4. The cable car according to claim 1, wherein the classification unit is configured to generate a spectrogram from at least one of: the detected measurement variable and the variable derived therefrom; and wherein the classification unit is further configured to determine the at least one defined safety-relevant sound event from the spectrogram.

5. The cable car according to claim 1, further comprising a classification model in the classification unit configured to determine the at least one defined safety-relevant sound event from the spectrogram.

6. The cable car according to claim 5, wherein the classification model is configured to determine a confidence value representative of a probability of the presence of the at least one defined safety-relevant sound event, and the control unit is configured to operate the cable car in the safety operating mode if the confidence value exceeds a threshold value.

7. The cable car according to claim 6, further comprising an analysis model configured to analyze a detection performance of the classification model, and wherein the threshold value is set, at least in part, as a function of the analysis model.

8. The cable car according to claim 5, wherein the classification model comprises an artificial intelligence model.

9. The cable car according to claim 1, wherein the at least one defined safety-related sound event comprises a defined characteristic cry of a person, including at least one of a cry for help, a pain-related cry, an aggressive cry, and a fearful cry.

10. The cable car according to claim 1, wherein the cable car further comprises a drive apparatus for driving the cable car vehicles;

wherein the control unit is configured to control the drive apparatus in the safety operating mode; and wherein the safety operating mode comprises at least one of:

stopping the drive of the cable car vehicles;

reducing a conveyor speed of the cable car vehicles; and generating an alarm signal with a signal apparatus comprising at least one of an acoustic alarm signal, an optical alarm signal, and an electronic alarm signal.

11. A method for operating a cable car with a number of cable car stations and with a number of cable car vehicles which are moved between the number of cable car stations by means of a hoisting rope, wherein the cable car is controlled by means of a control unit, comprising the steps of:

detecting a measurement variable of an airborne sound in at least one cable car station;

identifying at least one defined safety-relevant sound event from at least one of the measurement variable and a variable derived therefrom with a classification unit;

selecting a defined safety operating mode corresponding to the identified safety-relevant sound event; and operating the cable car in the selected defined safety operating mode when the at least one defined safety-relevant sound event is identified.

12. The method according to claim 11, wherein the step of detecting the measurement variable further comprises at least one of: detecting the measurement variable with a microphone and detecting the measurement variable in the area of a platform of the at least one cable car station.

13. The method according to claim 11, further comprising at least one step of: detecting a sound pressure as the measurement variable and using a sound pressure level as the derived measurement variable.

14. The method according to claim 11, further comprising the steps of:

generating a spectrogram of the detected measurement variable with the classification unit; and determining the at least one defined safety-relevant sound event from the spectrogram.

15. The method according to claim 11, further comprising determining the at least one defined safety-relevant sound event with a classification model implemented in the classification unit.

16. The method according to claim 15, further comprising determining with the classification model a confidence value representative of a probability of a presence of the at least one defined safety-relevant sound event; and operating the cable car with the control unit in the safety operating mode when the confidence value exceeds a threshold value.

17. The method according to claim 16, further comprising determining the threshold value at least in part as a function of an accuracy hit ratio model.

18. The method according to claim 15, wherein the classification model comprises an artificial intelligence model.

19. The method according to claim 11, wherein the at least one defined safety-related sound event comprises a defined characteristic cry of a person, including at least one of a cry for help, a pain-related cry, an aggressive cry, and a fearful cry.

20. The method according to claim 11, wherein the safety operating mode comprises at least one of:

stopping a drive of the cable car vehicles is stopped;

reducing a conveyor speed of the cable car vehicles;

generating at least one alarm signal with a signal apparatus comprising at least one of an acoustic alarm signal, an optical alarm signal, and an electronic alarm signal.

* * * * *